O. SCHUBERT.
CORN AND CANE HEADER.
APPLICATION FILED FEB. 14, 1911.
1,031,472.
Patented July 2, 1912.
4 SHEETS—SHEET 1.
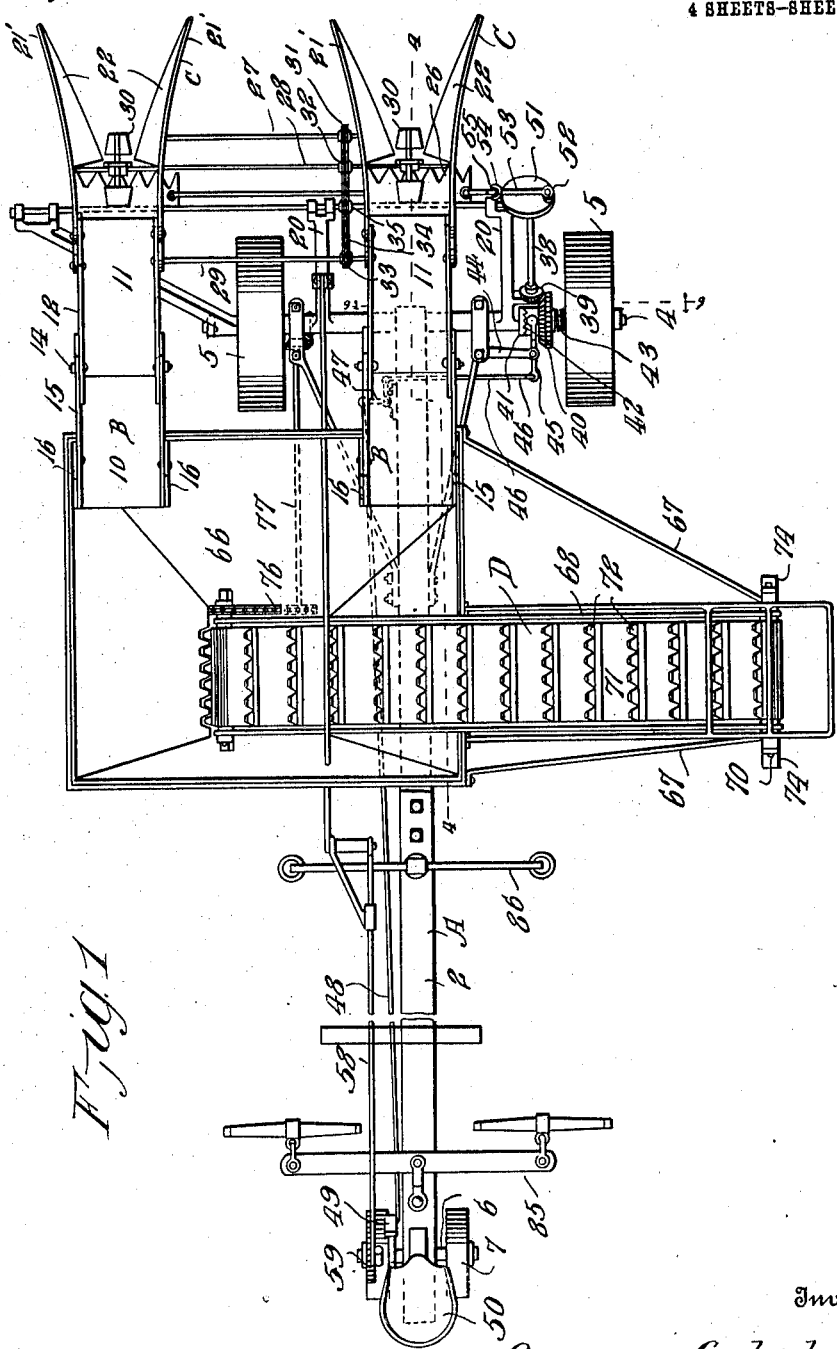

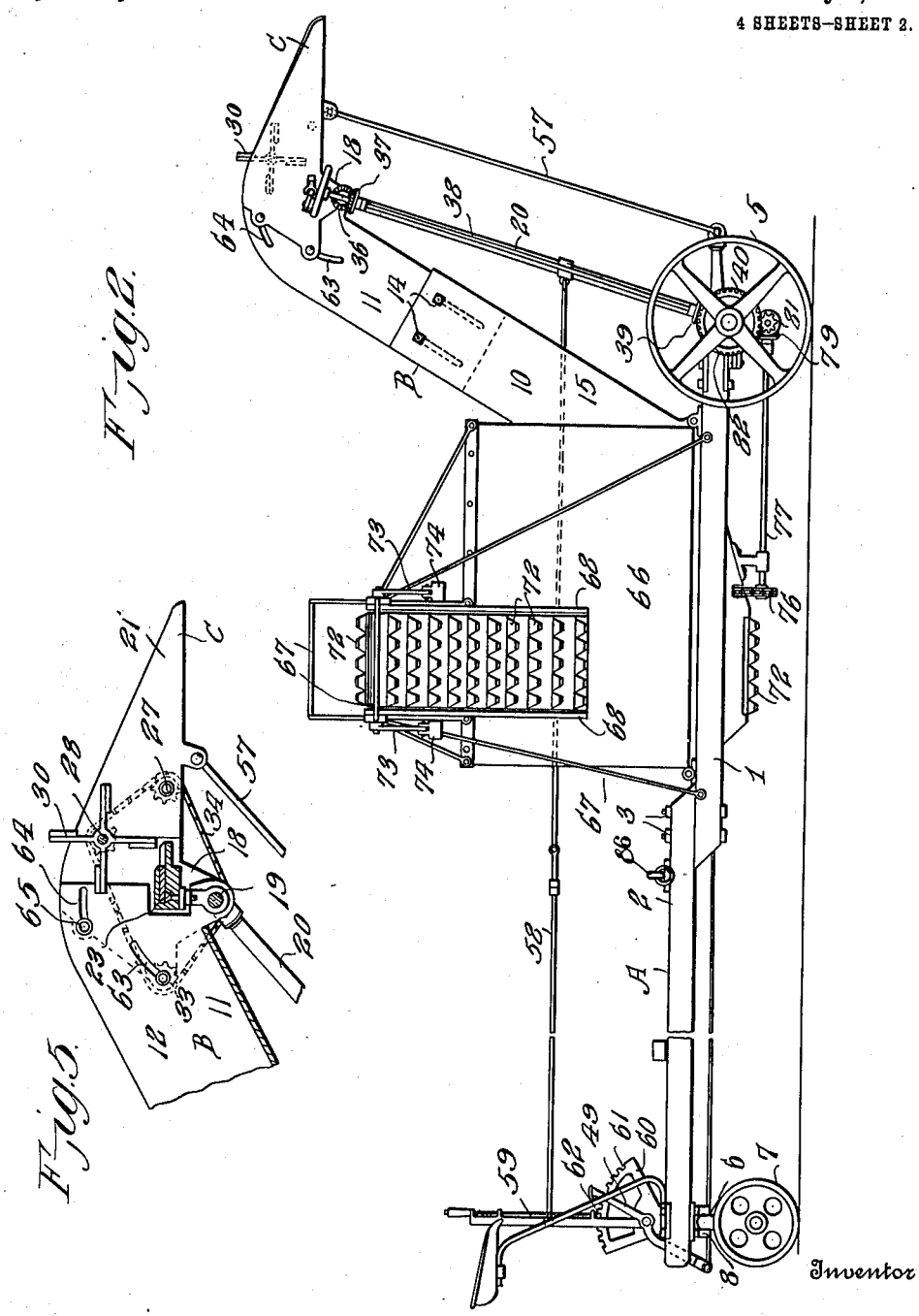

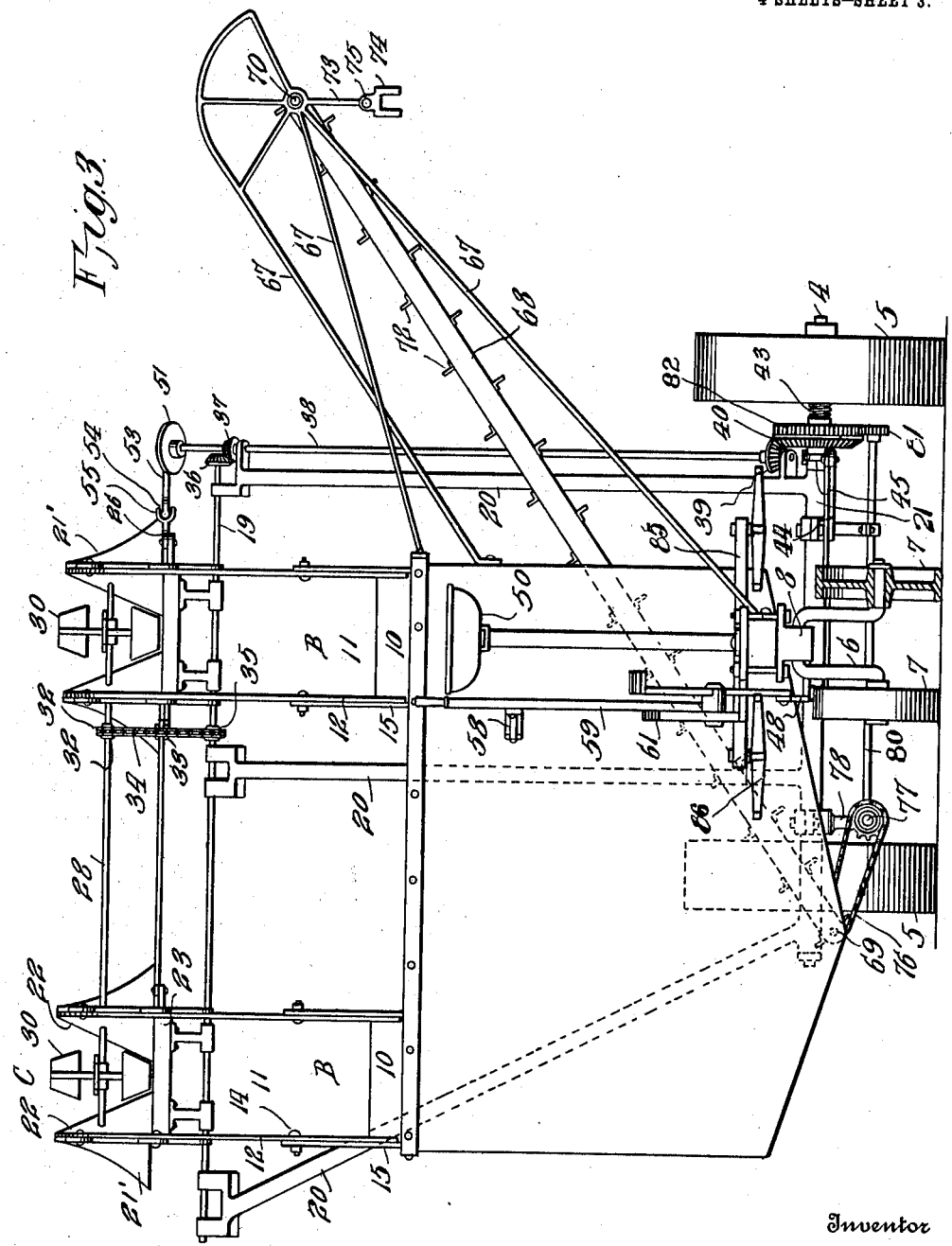

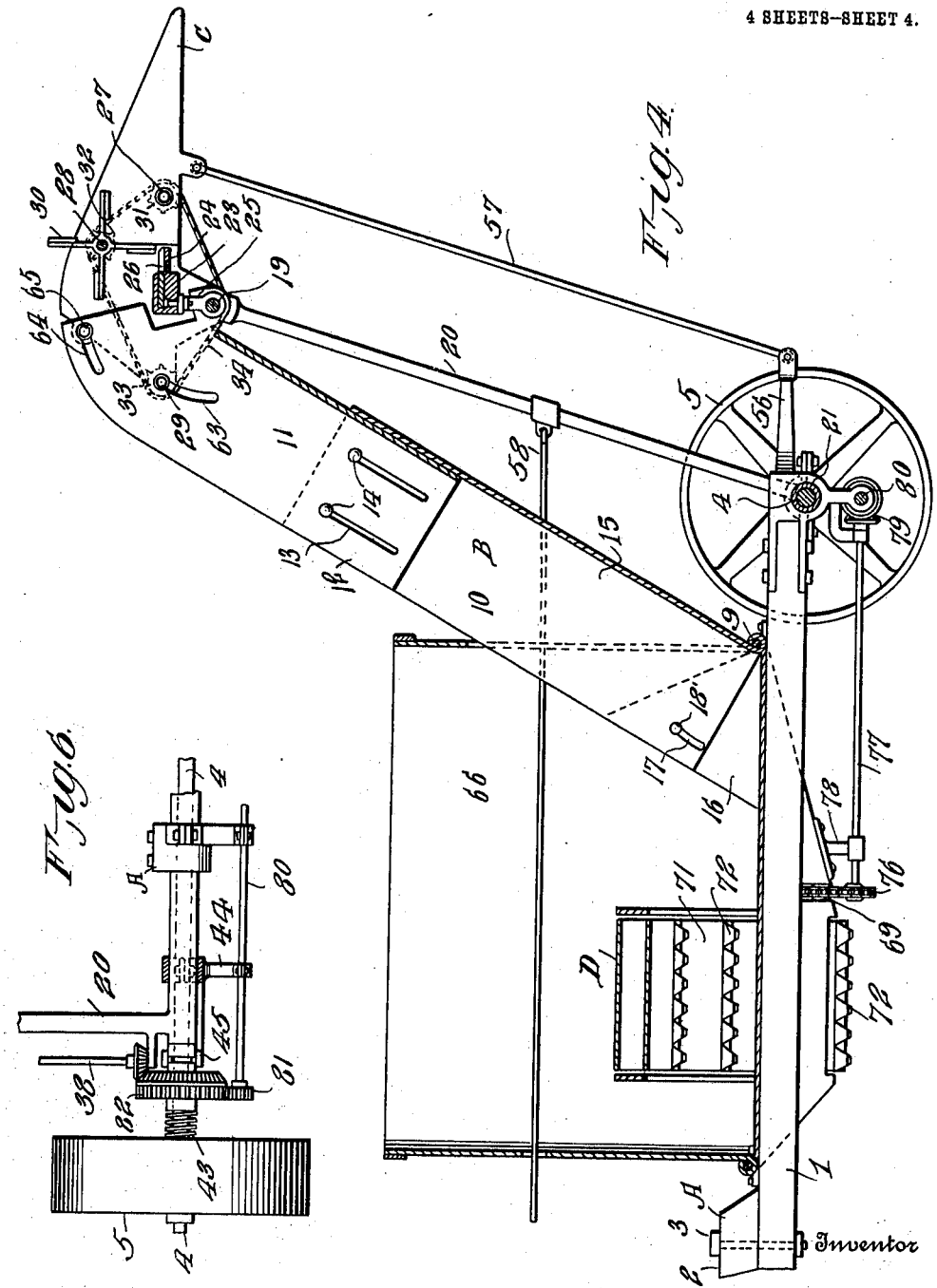

UNITED STATES PATENT OFFICE.

OSCAR SCHUBERT, OF KANSAS CITY, MISSOURI.

CORN AND CANE HEADER.

1,031,472.  Specification of Letters Patent.  Patented July 2, 1912.

Application filed February 14, 1911. Serial No. 608,530.

*To all whom it may concern:*

Be it known that I, OSCAR SCHUBERT, a citizen of the United States of America, residing at Kansas City, in the county of Jackson and State of Missouri, have invented new and useful Improvements in Corn and Cane Headers, of which the following is a specification.

This invention relates to harvesting machines, and it has particular reference to machines for heading cane, milo maize, kaffir corn, broom corn and allied species of corn.

The invention has for its object to produce a simple and improved machine adapted to operate upon one or more rows of plants and in which the cutting apparatus may be conveniently adjusted vertically while the machine is in motion within extensive limits to enable the machine to operate upon stalks of various lengths.

A further object of the invention is to provide conveying means associated with and adjustable with the cutting apparatus for conveying the heads to elevating and carrying mechanism, whereby they may be loaded into a receptacle such as the box of a wagon driven alongside the harvesting machine.

A further object of the invention is to provide a simple and improved construction whereby the guides associated with the cutting mechanism shall be adjustable with the latter and be maintained always in a horizontal position, and to provide reels or beaters likewise associated with the cutting mechanism.

Further objects of the invention are to simplify and improve the general construction and operation of a machine of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a side elevation of the same. Fig. 3 is a rear elevation, the same being drawn on a somewhat larger scale. Fig. 4 is a longitudinal vertical sectional view, enlarged, taken on the plane indicated by the line 4—4 in Fig. 1. Fig. 5 is a detail view of a portion of the machine including the cutting apparatus with dotted lines indicating a different position of the same. Fig. 6 is a sectional detail view taken on the line 6—6 in Fig. 1.

Corresponding parts in the several figures are denoted by like characters of reference.

The frame of the machine includes a pole or tongue A which is preferably formed of two pieces or members 1 and 2, the front piece 1 being offset downwardly and overlapped by the rear piece 2 with which it is connected by suitable fastening means, such as bolts 3, 3. The forward end of the pole or tongue is suitably supported upon the main axle 4 having transporting wheels 5, and the rear end of the tongue is supported upon an arched axle 6 having guide wheels 7, said rear axle being secured in a housing 8 which is suitably swiveled upon the underside of the tongue so as to be capable of turning, thereby facilitating the guiding of the machine. The forward portion of the tongue constitutes a sill upon which a portion of the framework of the machine is supported, and this portion of the tongue being offset downwardly, it follows that the framework is supported as close as possible to the ground.

In the drawings hereto attached has been shown a machine adapted to operate simultaneously upon two rows of plants, but it is obvious that by making such changes as will readily suggest themselves to the skilled mechanic, a machine may be constructed to operate upon a single row or upon more than two rows of plants, if desired.

Pivotally connected with a rod or shaft 9 supported upon and extending transversely of the tongue near the front end of the latter are the lower ends of the troughs or chutes B, each of which is composed of a lower section 10 and an upper section 11 arranged to telescope together, the side members 12 of one of said sections being provided with slots 13 for the passage of studs or connecting members 14 associated with the side members 15 of the other section. Base members 16 adjacent to the side members of the lower section of each chute or trough are provided with arcuate slots 17 for the passage of studs or connecting members 18 associated with the side members 15 of the lower sections, thus permitting the latter to swing about the axis of the rod 9.

The top members 11 of the respective chutes or troughs are provided with brackets 18 serving to support a rod or shaft 19 extending transversely below the chutes or troughs, and said shaft is connected by brace members 20 with the sleeves 21 upon the front axle 4. The number of these braces may be varied, but for the purpose of illustration three braces have been shown, the same being disposed, respectively, between and adjacent to the outer sides of the troughs or chutes. One of said braces has been shown as occupying an inclined position to accommodate one of the troughs which is offset to one side of the tongue. Each of the troughs or chutes is provided at its upper end with a guide member C which is pivoted upon the shaft 19 said guide member being provided with forwardly extending divergent arms 21′ constituting guides for the tops of the stalks that are to be cut, and said arms are provided with inwardly extending rearwardly convergent flanges 22. Each of the guide members carries a support 23 for a finger bar 24, said support being provided with a downwardly extending arm 25 which is pivoted upon the shaft 19, and associated with each finger bar is a cutter bar 26 which is mounted for reciprocation in the usual well known manner.

The guide members C afford bearings for shafts 27, 28 and 29, one of which carries reels or beaters 30, one such beater being associated with each guide member where it is arranged intermediate the arms or guides 21 so as to operate in the space or guideway between the convergent rear ends of the flanges 22. The shafts 27, 28 and 29 are equipped with sprocket wheels 31, 32, 33 which are connected by a chain or link belt 34, with a sprocket wheel 35 upon the shaft 19. The latter is provided with a bevel pinion 36 meshing with a bevel pinion 37 upon a shaft 38 which is supported in suitable bearings upon one of the braces 20, the lower end of said shaft being provided with a bevel pinion 39 meshing with a bevel gear 40 which is mounted for rotation upon the axle 4. The latter carries a clutch member 41 with which a clutch member 42 formed upon the hub of the bevel gear 40 is normally held in engagement by the action of a spring 43. A suitably supported bracket 44 carries a shipping lever 45, one end of which engages the hub of the bevel gear 40, while the other end of said shipping lever is connected by a link 46 with one arm of a bell crank 47, the other arm of which is connected by a link 48 with a foot lever 49 arranged in suitable proximity to the driver's seat 50 at the rear end of the tongue, whereby the bevel gear 40 may be moved against the tension of the spring 43 to throw the clutch members 41, 42 out of engagement, thereby causing the axle to revolve idly with reference to the bevel gear 40, and suspending operation of the parts that are actuated by said bevel gear.

The upper end of the shaft 38 carries a disk 51 having a wrist pin 52 with which is connected one end of a pitman 53, the other end of which has a ball 54 engaging a socket 55 at one end of the cutter bar 26 to which reciprocatory motion may thus be transmitted.

The frame of the machine has a forwardly extending arm or bracket 56 which is connected with the underside of one of the hoods C by means of a brace 57 arranged in parallel relation to the brace members 20. One of the brace members 20 is connected by means of a link rod 58 with an operating lever 59 fulcrumed upon a lever stand 60 near the rear end of the tongue, said lever stand supporting also the foot lever 49 to which reference has hereinbefore been made. The lever stand 60 includes a segment rack 61 adapted to be engaged by a stop member 62 upon the lever 59, which latter, together with the parts actuated thereby, may thus be securely retained at various adjustments.

The top members 11 of the chutes or troughs B are provided with arcuate slots 63 and 64, the former for the accommodation of the shaft 29 and the latter for the passage of connecting or fastening members 65, said arcuate slots being of sufficient length to permit the hoods to be tilted to various positions with relation to the upper ends of the chutes or troughs.

The lower ends of the chutes or troughs B are arranged to discharge into a hopper 66 which is suitably supported upon the tongue which constitutes the supporting sill of the machine. It is obvious that the hopper, as well as other parts of the machine, may be braced and reinforced in any suitable and convenient manner.

D designates an elevator, the lower end of which extends into the hopper and the upper end of which, which extends laterally from the tongue, is supported by means of braces 67. The elevator includes a suitable trough or casing 68 adjacent to the lower and upper ends of which shafts 69, 70 are supported for rotation, said shafts serving to support an endless carrier 71 equipped with flights or fingers 72. The shaft at the upper end of the elevator carries pivoted arms 73, at the lower ends of which bifurcated clamps 74 are pivotally attached by means of pins 75, enabling said clamps to be supported upon the upper edge of one side member of a wagon box, as will be readily understood. The shaft 69 at the lower end of the elevator receives motion through a chain or link belt 76 from a shaft 77 which is supported in suitable bearings 78 longitudinally of the tongue of the machine, the front end of said shaft 77 being connected by bevel gearing 79 with a counter shaft 80 which is supported in suitable bearings below and in parallel relation to the axle 4. The shaft 80 carries a pinion 81 meshing with a spur wheel 82 associated with the bevel gear 40, from which motion will thus be transmitted to the elevator when the machine is in operation.

From the foregoing description, taken in connection with the drawings hereto annexed, the operation and advantages of this machine will be readily understood. It will be seen that by manipulating the lever 59, the chutes or troughs B may be tilted downwardly and forwardly or upwardly and rearwardly, thus lowering or raising the hoods and guides associated with the upper ends of said troughs or chutes, the hoods, together with the cutting apparatus, being meanwhile maintained in an approximately horizontal position, owing to the presence of the bars or braces 57 which are arranged in parallel relation to the brace members 20, and whereby the hoods will be tilted with reference to the troughs or chutes as the latter are being adjusted. The range of adjustment is quite extensive, enabling the machine to operate successfully upon stalks of various length, it being intended to so construct the machine that the range of adjustment will not be less than three feet or as much in excess of this as may be found necessary or desirable. When the cutting apparatus is being lowered, the chutes or troughs, composed of telescoping members 10 and 11, will obviously be extended, while when the cutting apparatus is being elevated the chutes or troughs will be contracted. The stalks will be guided between the divergent arms 21 to the cutting apparatus, and the beaters or reels will be rotated to hold the heads of the stalks in engagement with the cutting apparatus while being severed, after which by the continued motion of the reels the stalks may be discharged rearwardly into the troughs or chutes over which they are conveyed to the hopper 66 where they drop upon the elevator D, whereby the tops are conveyed to the box of a wagon which is driven alongside the machine. The draft animals by which the machine is propelled or pushed are hitched to an evener 85 mounted near the rear end of the tongue, and a neck yoke 86 is also provided.

Having thus described the invention, what is claimed as new, is:—

1. In a machine for heading cane, kaffir corn and the like, a push tongue constituting a supporting sill, a revoluble axle supporting the front end of the same, transporting wheels upon said axle, a telescoping extension chute hingedly connected with the sill a guide member hingedly associated with said chute and having divergent guide arms, cutting apparatus supported upon the guide member, supporting and adjusting means for the guide member including means whereby said guide member will be maintained in an approximately horizontal position at various adjustments, and means for driving the cutting apparatus.

2. In a machine of the class described, a wheel supported frame structure, a telescoping extension chute hingedly connected therewith, a guide member hingedly supported adjacent to the upper end of the chute and having forwardly divergent arms constituting guides and equipped with rearwardly converging flanges coöperating to form a guideway, cutting apparatus supported by the hood and arranged in the path of material passing through the guideway, means for supporting and adjusting the guide member including pivoted brace members arranged in parallel relation, and means for transmitting motion to the cutting apparatus from the supporting wheels.

3. In a machine of the class described, a wheel supported frame structure, a telescoping extension chute hingedly connected therewith, a guide member hingedly associated with the chute and including divergent guide arms, cutting apparatus supported upon the guide member, a rotary reel supported by the hood, means for supporting and adjusting the guide member including pivoted brace members arranged in parallel relation, and means for transmitting motion from the supporting wheels to the cutting apparatus and the reel.

4. In a machine of the character described, a wheel supported frame structure, a telescoping extension chute hingedly connected therewith, a guide member hingedly connected with the extension chute cutting apparatus supported upon the guide member, a reel supported for rotation upon the guide member, supporting and adjusting means for the guide member including pivoted brace members arranged in parallel relation, means for transmitting motion from the supporting wheels to the cutting apparatus and to the reel, a hopper disposed at the lower end of the chute, an elevator extending downwardly into the hopper and upwardly and laterally from the frame, and means for transmitting motion to the elevator from the rotary supporting means.

5. In a machine of the character described, a frame structure, rotary supporting means for the same including a revoluble front axle, a telescoping chute hingedly connected with the frame structure, a transverse shaft supported adjacent to the upper end of the chute, a guide member hingedly supported upon the shaft and including divergent guide arms, sleeves upon the axle, brace members connecting said sleeves with the transverse guide member supporting shaft, an arm extending forwardly from the frame structure, a brace member connecting said arm with the guide member and arranged in parallel relation to the first mentioned brace members, lever-actuated adjusting means connected with one of the brace members, cutting apparatus supported upon the guide member, a reel supported for rotation upon the guide member, means for transmitting motion from the transverse guide member supporting shaft to the reel, means for transmitting motion from the rotary supporting means of the machine to the transverse guide member supporting shaft, and means for actuating the cutting apparatus associated with the last mentioned transmission means.

In testimony whereof I affix my signature in presence of two witnesses.

OSCAR SCHUBERT.

Witnesses:
 DENA THORSELL,
 E. E. THORSELL.

Copies of this patent may be obtained for five cents each, by addressing the "Commissioner of Patents, Washington, D. C."